(12) United States Patent
Yoshigahara et al.

(10) Patent No.: US 7,643,689 B2
(45) Date of Patent: Jan. 5, 2010

(54) ENCODED DATA CONVERSION METHOD

(75) Inventors: Noriyuki Yoshigahara, Kanagawa-ken (JP); Eito Sakakima, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 741 days.

(21) Appl. No.: 11/407,237

(22) Filed: Apr. 20, 2006

(65) Prior Publication Data
US 2006/0239566 A1 Oct. 26, 2006

(30) Foreign Application Priority Data
Apr. 21, 2005 (JP) ............... 2005-123502

(51) Int. Cl.
*G06K 9/36* (2006.01)
(52) U.S. Cl. .................................... 382/232
(58) Field of Classification Search ......... 382/232–233, 382/239, 244–250; 348/50, 51, 65, 67
See application file for complete search history.

(56) References Cited

U.S. PATENT DOCUMENTS

| | | | | |
|---|---|---|---|---|
| 6,078,690 A | * | 6/2000 | Yamada et al. ............. | 382/233 |
| 6,310,647 B1 | * | 10/2001 | Parulski et al. .......... | 348/231.99 |
| 6,668,086 B1 | * | 12/2003 | Enokida ..................... | 382/233 |
| 6,947,599 B2 | * | 9/2005 | Takemura ................. | 382/232 |
| 7,327,290 B1 | * | 2/2008 | Li ............................. | 341/65 |
| 2003/0128765 A1 | | 7/2003 | Yoshigahara ........... | 375/240.25 |
| 2005/0013495 A1 | | 1/2005 | Yoshigahara ............ | 382/233 |

FOREIGN PATENT DOCUMENTS

JP 2003-209639 7/2003

* cited by examiner

*Primary Examiner*—Jose L Couso
(74) *Attorney, Agent, or Firm*—Fitzpatrick, Cella, Harper & Scinto

(57) ABSTRACT

The present invention intends to provide an encoded data conversion method for speeding up conversion processing by eliminating re-encoding processing when predetermined data is inserted into encoded data. The encoded data conversion method is a conversion method for converting encoded image data comprising: a step of decoding encoded image data; and a step of inserting a code for eliminating re-encoding of subsequent data after the predetermined data.

9 Claims, 11 Drawing Sheets

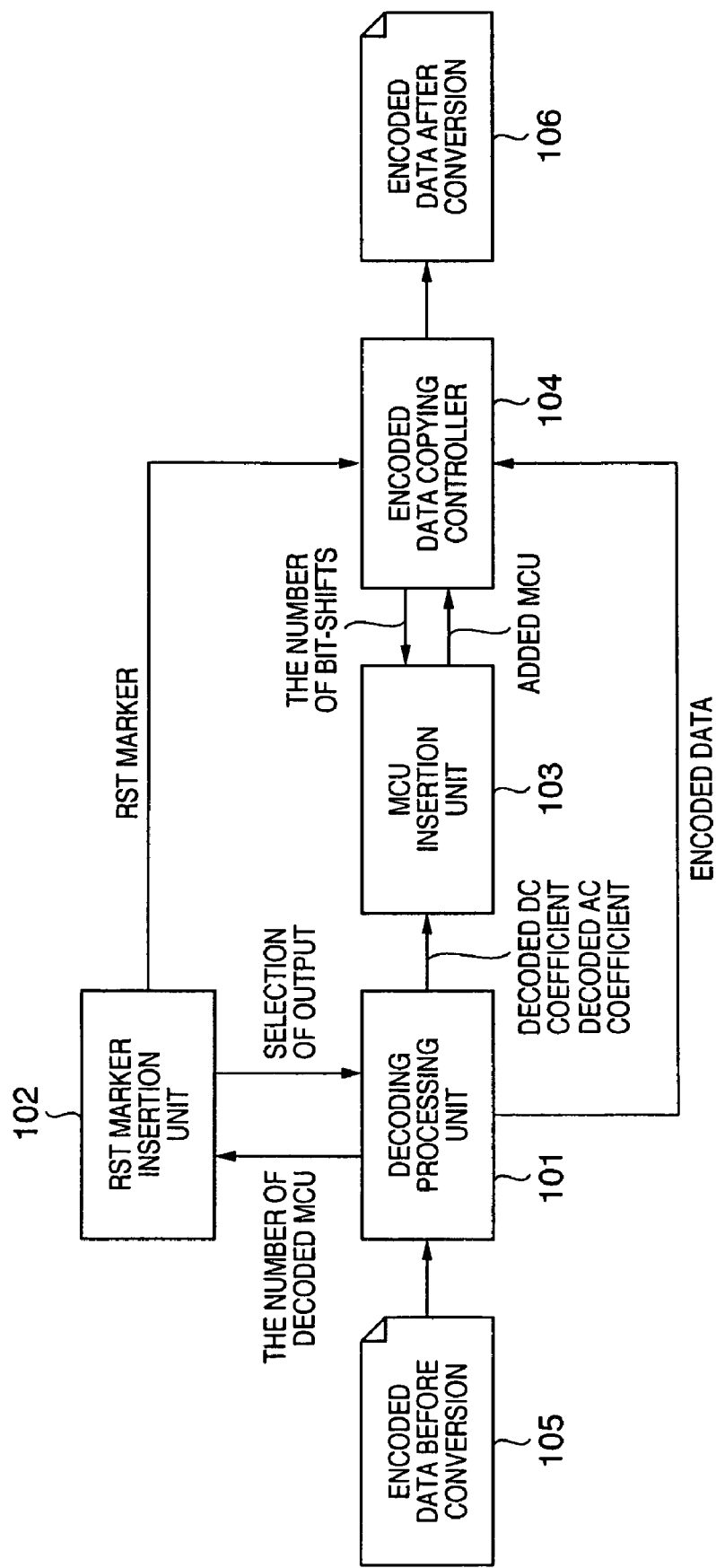

CORRECTION AREA (IN 8 × 8 BLOCK)

EXAMPLES OF CODES FOR CORRECTION

| No. | bit CORRECTION VALUE | ENCODED CODE TO BE ADDED | VALUE TO BE ADDED |
|---|---|---|---|
| 1 | 0(8) | 11011(5bit)+0(1bit)+EOB(2bit) | run:2 value:1 |
| 2 | 1(9) | 111010(6bit)+0(1bit)+EOB(2bit) | run:4 value:1 |
| 3 | 2 | EOB(2bit) | NONE |
| 4 | 3(11) | 11111001(8bit)+0(1bit)+EOB(2bit) | run:8 value:1 |
| 5 | 4(12) | 111110111(9bit)+0(1bit)+EOB(2bit) | run:9 value:1 |
| 6 | 5 | 01(2bit)+0(1bit)+EOB(2bit) | run:0 value:1 |
| 7 | 6(14) | 11010(5bit)+0(1bit)11010(5bit)+0(1bit)+EOB(2bit) | run:2 value:1 / run:1 value:1 |
| 8 | 7 | 1011(4bit)+0(1bit)+EOB(2bit) | run:1 value:1 |

ENCODED DATA CONVERSION METHOD

FIELD OF THE INVENTION

The present invention relates to an encoded data conversion method.

BACKGROUND OF THE INVENTION

Japanese Patent Laid-Open No. 2003-209639 describes a header inserting method (JPEG (Joint Photographic Experts Group) encoded data conversion method) with re-encoding processing. That method inserts a header into JPEG encoded data by deleting 0x00, which follows 0xFF, from the JPEG encoded data, bit-shifting attached JPEG encoded data by header insertion, and inserting 0x00 after 0xFF into the bit-shifted JPEG encoded data.

A data structure of a JPEG encoded image will be briefly described with reference to FIG. 10.

A JPEG image is generated by encoding an inputted original image is divided into blocks of 8 pixels×8 pixels. First, DCT (Discrete Cosine Transform) processing and quantization processing are performed for each block of 8 pixels×8 pixels. A block denoted by the reference numeral 1001 in FIG. 10 represents a block after the DCT processing. Each pixel after the DCT processing is called a DCT coefficient. Huffman encoding is performed after the DCT processing. The Huffman encoding is performed in the order of the numbers given to each pixel in the block 1001 of FIG. 10.

In the block 1001, $0^{th}$ coefficient is called a DC coefficient and the other coefficients are called AC coefficients.

The reference numeral 1002 of FIG. 10 denotes an MCU (Minimum Coded Unit). The MCU is a set of blocks 1001. In the example of FIG. 10, four blocks make one MCU.

A set of MCUs makes a JPEG encoded image. Between an MCU and an MCU, a marker code called an RST marker (Restart Marker) can be inserted at a certain interval. The RST markers may or may not be inserted. The RST markers may be inserted at any interval. FIG. 10 shows a case where an RST marker 1003 is inserted for every two MCUs. The marker code of JPEG must be inserted as it is byte-aligned. Therefore, when an RST marker 1003 is inserted, "1" bit needs to be inserted by the number necessary to byte-align and the RST marker needs to be inserted after the byte-align.

When the DC coefficient in a block is encoded, a DC coefficient of a previously encoded block is used. That is called DC coefficient prediction. The DC coefficient prediction is effective in an interval for an RST marker to be inserted. The DC coefficient prediction is not performed on a block immediately after an RST marker is inserted.

A JPEG image is subjected to processing called byte stuff processing. The byte stuff processing is the processing for inserting 0x00 immediately after 0xFF code when 0xFF code in a byte-aligned state is in a JPEG image. In order to decode the processed image, the inserted 0x00 is deleted first, and then decoding processing is performed.

A usual procedure for inserting an RST marker into a JPEG encoding image without an RST marker being inserted will be described with reference to FIG. 11.

FIG. 11 is a flowchart showing a conversion procedure for inserting an RST marker into a JPEG encoded image without an RST marker being inserted and converting it into a JPEG encoded image with an RST marker being inserted.

First at step S1101, changing processing is performed on a header. At this step, a marker code indicating that the JPEC encoded image includes an RST marker is added. The other headers are not changed.

Conversion processing is performed by each MCU. At step S1102, decoding processing is performed on an MCU. The decoding processing is the Huffman decoding processing and the DC coefficient prediction decoding processing. In this conversion processing, neither invert quantization processing nor invert DCT processing is needed. Decoding processing up to the DC coefficient prediction is performed here from the viewpoint of conversion efficiency. The DCT coefficient prediction is needed because a DC coefficient prediction is reset after an RST marker is inserted and a DC coefficient value of an MCU immediately after the RST marker is inserted changes.

After decoding processing of an MCU, encoding processing is performed on an MCU as shown in step S1103. The encoding processing performed in this step is a re-encoding of a DC coefficient value and a byte stuff processing. The re-encoding of a DC coefficient value is performed when DC coefficient prediction processing changes due to RST marker insertion as mentioned above. Similarly, the byte stuff processing has to be performed again because an encoded image is bit-shifted when an RST marker is inserted. Japanese Patent Laid-Open No. 2003-209639 describes a method for performing byte stuff processing again and re-converting a JPEG encoded image. At step S1104, whether or not to insert an RST marker is determined. Insertion of an RST marker is performed for each previously designated MCU interval. After the designated MCU decoding processing and encoding processing, insertion of an RST marker is performed at step S1105. As mentioned above, when an RST marker is inserted, byte-align processing is performed and the head position of an RST marker is set to the head position of a byte.

Processing mentioned above is performed on all the MCUs in a JPEG image. Then, the conversion processing of the JPEG image ends.

As mentioned above, in usual conversion processing performed when an RST marker is inserted into a JPEG image encoded image, decoding processing and encoding processing (re-encoding processing of a DC coefficient and byte stuff processing) have to be performed on all the MCUs. That causes a problem of slowing the conversion processing.

The encoded data conversion method of the present invention adds codes for avoiding bit-shift after predetermined data is inserted to eliminate byte stuff processing which is applied to an encoded image. As the invention described in Japanese Patent Laid-Open No. 2003-209639 does not have this technique, it needs a series of re-encoding processing including deletion of 0x00 which follows 0xFF in unconverted JPEG encoded data, bit-shift processing due to insertion of predetermined data, and insertion of 0x00 after 0xFF into bit-shifted JPEG encoded data, as described in the claim 4 in Japanese Patent Laid-Open No. 2003-209639.

The invention described in Japanese Patent Laid-Open No. 2003-209639 has a problem in that it slows down conversion processing as when it performs conversion by inserting a header into JPEG encoded data it needs re-encoding processing of JPEG encoded data.

SUMMARY OF THE INVENTION

The present invention intends to provide an encoded data conversion method for speeding up conversion processing by eliminating re-encoding processing when predetermined data is inserted into encoded data.

The present invention is a conversion method for converting encoded image data comprising: a first inserting step of inserting predetermined data into encoded image data; and a second inserting step of inserting a code for eliminating re-encoding of subsequent data after the predetermined data.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 1 is a block diagram showing an embodiment of the present invention;

DETAILED DESCRIPTION OF THE PREFERRED EMBODIMENTS

Figures 2A, 2B:
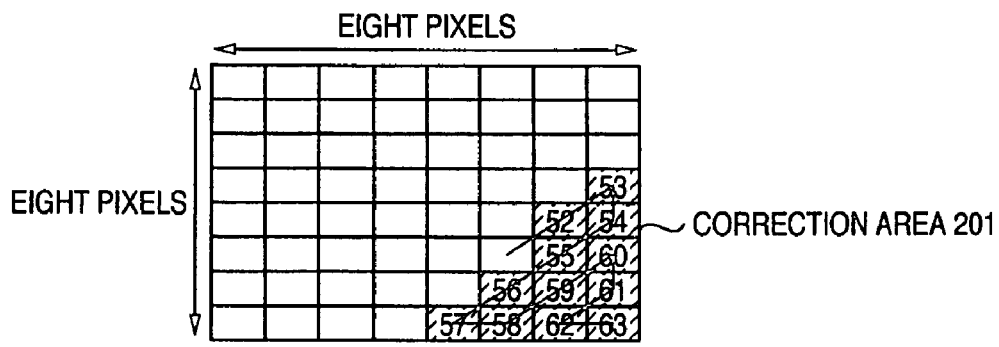
FIGS. 2A and 2B are diagrams illustrating a method of inserting a code for adjusting a bit position at an MCU inserting unit and the code.

Preferred embodiments of the present invention will now be described in detail in accordance with the accompanying drawings.

The encoded data conversion method of the present invention relates to a conversion method of inserting predetermined data into JPEG encoded data. Specifically, the present invention is preferably applied to the case where an RST maker is inserted into a JPEG encoded data. This is because the present invention can implement flexible decoding processing such as decoding processing performed by extracting a part in the JPEG image by inserting an RST marker into the JPEG encoded data.

An embodiment of the present invention will be detailed by exemplifying a case where the present invention is applied to a JPEG image with reference to FIG. 1.

FIG. 1 is a block diagram showing an embodiment of the present invention.

A decoding processing unit 101 in FIG. 1 performs decoding processing on an encoded data before conversion 105 to be inputted. The decoding processing implemented at the decoding processing unit 101 is desirably the minimum decoding processing which is necessary to convert JPEG encoded data from a viewpoint of throughput. First, at the decoding processing unit 101, decoding processing of Huffman encoding is performed on the encoded data before conversion 105. Then, predictive decoding processing of a DC coefficient is performed. The decoded DC coefficient and AC coefficient information are sent to an MCU insertion unit 103 to be described later, as required. Prior to decoding processing, deletion of "0x00" (removing processing of byte stuff) immediately after "0xFF" in encoded data is performed at the decoding processing unit 101.

The decoding processing unit 101 selects and sends out data to be outputted from output selection signals which are sent from an RST marker insertion unit to be described later. In such a case, the data to be outputted is sent out as a decoded DC coefficient and a decoded AC coefficient are sent out to the MCU insertion unit 103 or as encoded data before conversion 105 is sent out to an encoded data copying controller 104. Here, the output selection signal sent out from the RST marker insertion unit 102 is a signal for switching the outputting ways above.

The number of MCUs decoded at the decoding processing unit 101 is sent to the RST marker insertion unit 102 to be described later, as required. For example, the decoding processing unit 101 counts the number of MCUs each time it decodes an MCU and informs the RST marker insertion unit 102 on the number of MCUs. The decoding processing unit 101 may inform the RST marker insertion unit 102 that an MCU is decoded each time it decodes an MCU and the RST marker insertion unit 102 may count the number of MCUs each time the RST marker insertion unit 102 gets the information.

The RST marker insertion unit 102 sends out an RST marker to be inserted for each designated insertion interval of RST markers (MCU unit) according to the result of the decoding processing. The sent out RST marker is sent to the encoded data copying controller 104 and incorporated in an encoded data after conversion 106.

Sending out of an RST marker is determined by a previously designated insertion interval (MCU interval) and the number of decoded MCUs which is sent from the decoding processing unit 101. If the number of decoded MCUs reaches the MCU interval for an RST marker to be inserted, the RST marker insertion unit 102 sends out an RST marker to be inserted. The RST marker insertion unit 102 sends an output selection signal to the decoding processing unit 101 according to the result of the decoding processing (the number of MCUs). If the RST marker insertion unit 102 sends out an RST marker, the output selection signal is a signal indicating that a decoded DC coefficient and a decoded AC coefficient are sent out to the MCU insertion unit 103. If the RST marker insertion unit 102 does not send out an RST marker, the output selection signal is a signal indicating that the encoded data before conversion 105 is sent out to the encoded data copying controller 104.

Although the RST marker may be inserted at any interval, it is preferably inserted for each line in a JPEG encoded image from the viewpoint of efficiency of conversion processing.

The MCU insertion unit 103 creates an MCU to be inserted immediately after an RST marker. Processing performed at the MCU insertion unit 103 includes: (1) conversion processing of an existing MCU and (2) adding processing of a new MCU. (1) and (2) will be described below, respectively.

(1) Description of Conversion Processing of an Existing MCU

Conversion processing of an existing MCU performed by the MCU insertion unit 103 is re-encoding performed to eliminate re-encoding processing on MCUs after the converted MCUs. Specifically, the processing eliminates change in a bit position due to insertion of an RST marker and re-encoding of a DC coefficient in converting an MCU immediately after an RST marker is inserted and makes MCUs after the converted MCUs have no change in a bit position. If a bit position is not changed, the encoded data before conversion can be copied as it is, which can omit unnecessary re-encoding processing.

In order to keep the state that a bit position is not changed for as many MCUs as possible, a code for absorbing a change in a bit position is added at the end of an MCU at the MCU insertion unit 103. The method will be described with reference to FIGS. 2A and 2B.

First, as shown in FIG. 2A, a correction area 201 for absorbing a change in a bit position is set in a high frequency component area of a block. In FIG. 2A, an area of 12 pixels is set as the correction area 201. Then, AC coefficients which should exist in the correction area 201 are deleted and an encoded code which can absorb a change in a bit position is added (inserted) to eliminate a change in a bit position. The encoded code needs to meet two points: it can absorb a change in a bit position and a decoded pixel of an encoded code can be included in the correction area 201.

Affects of degradation in image quality due to added encoded codes can be reduced as the correction area 201 is set in a high frequency component area. The encoded code to be added is preferably determined to lessen the decoded pixel value similarly because of the affects of degradation in image quality.

Examples of an encoded code to be added are shown in FIG. 2B. FIG. 2B is an example of a typical color difference Huffman table described in JPEG standards (JISX4301: digital compression and encoded processing of continuous gradation static image). The encoded code to be added is not limited to one and a plurality of codes can be added even in the same Huffman table. As a change in a bit position is a shift by the number of bits from the byte head, the changes are eight types from 0 to 7 (If the change exceeds eight, eight subtracted from the number is the change in a bit position). In FIG. 2B, examples of encoded codes to be added for eight types are shown respectively.

For example, if a bit position changes by "1 bit" compared to the encoded data before conversion, "7 bits" needs to be added to absorb a change in a bit position. By adding "7 bits", a change in a bit position becomes 8 bits, which causes the shift from a byte position to result in the same position as in the original state. If "7 bits" are added, the code No. 8 in FIG. 2B is added. That can realize re-conversion of an MCU which absorbed a change in a bit position and MCUs thereafter can be kept in a state of no change in a bit position.

Figure 3:
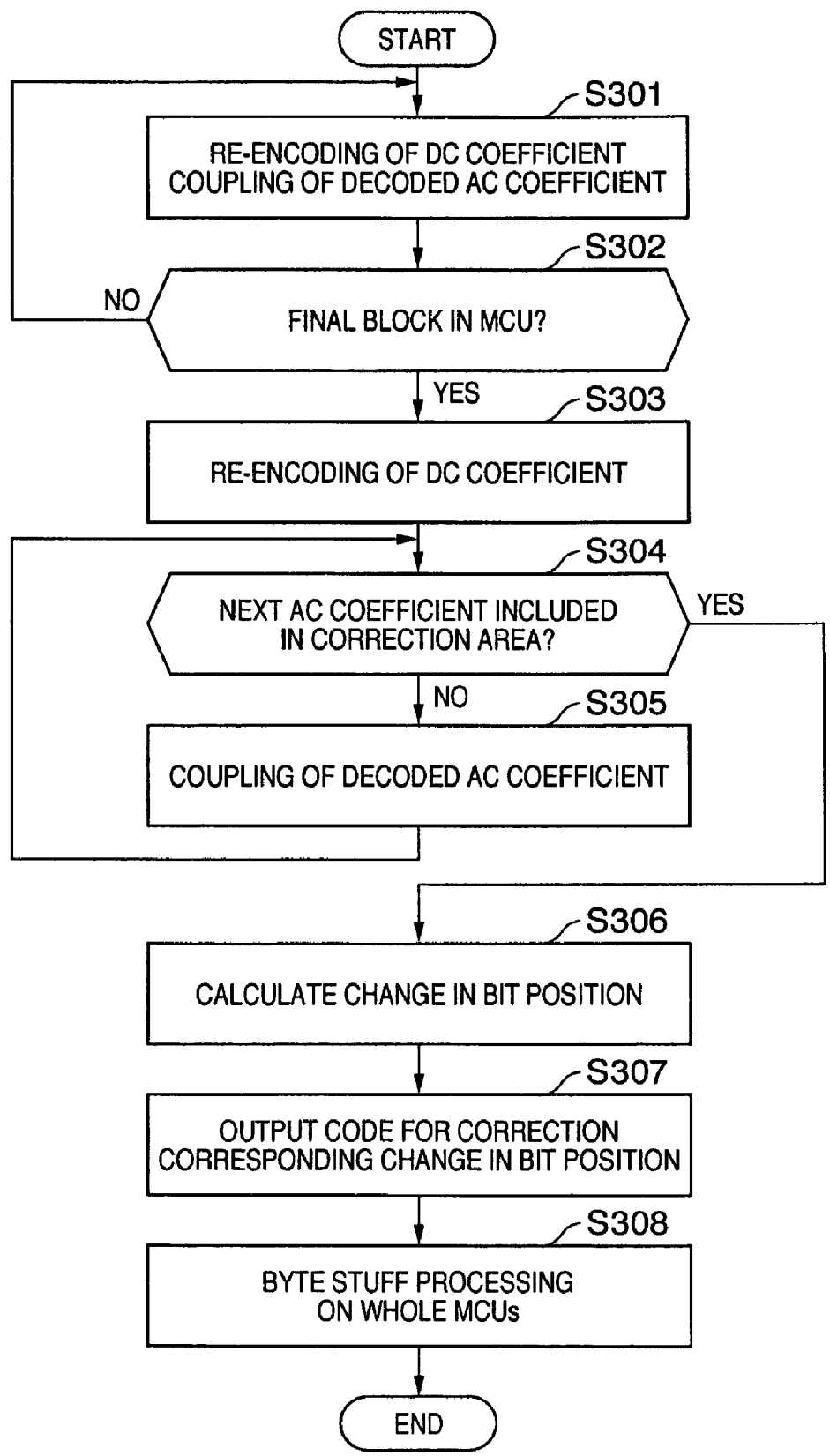
FIG. 3 is a flowchart showing a method for adjusting a bit position by converting an existing MCU at an MCU inserting unit.

Re-conversion processing at the MCU insertion unit 103 will be described with reference to a flowchart of FIG. 3. FIG. 3 is a diagram showing a flow of processing steps at the MCU insertion unit 103.

At step S301, re-encoding of the decoded DC coefficient and coupling of the decoded AC coefficient are performed. As the MCU converted at the MCU conversion unit 103 is an MCU immediately after an RST marker is inserted, a predicted value of the DC coefficient is reset to 0. Accordingly, re-encoding processing of the DC coefficient is required. Re-encoding processing of the DC coefficient is performed as a Huffman code corresponding to the DC coefficient value decoded at the decoding processing unit 101 of FIG. 1 is selected from a Huffman table. As prediction such as in encoding of a DC coefficient does not exist for an AC coefficient, Huffman code of a decoded and divided AC coefficient is coupled with an AC coefficient value again to make an encoded code. As a bit position may be shifted due to insertion of an RST marker and re-encoding of a DC coefficient, byte stuff processing needs to be performed again. The byte stuff processing may be performed as required at outputting an encoded code, performed when encoded data in a certain unit quantity is created, or the like. In the flow of FIG. 3, the case where the byte stuff processing is performed when encoded data in a certain unit quantity (MCU) is created is described (step S308).

At step S302, whether it is conversion of the final block in an MCU or not is determined. If it is the final block in an MCU, the operation proceeds to S303 and after.

Step S303 is re-encoding processing of a DC coefficient on the final block in an MCU. Re-encoding processing of a DC coefficient is the same as the re-encoding processing on the other blocks. Coupling of AC coefficient is performed thereafter. Every time coupling of an AC coefficient is performed, whether the AC coefficient to be coupled goes into a correction area or not is determined at step S304. If a correction area is set from pixel No. 52 to No. 63 as shown in FIG. 2A and a decoded pixel of the AC coefficient to be coupled is in No. 52 to No. 63, the operation proceeds to step S305 without coupling the pixels. If the pixels do not reach the correction area, coupling of the next AC coefficient is performed. A value decoded at the decoding processing unit 101 of FIG. 1 is used in determination on whether the pixel to be coupled goes into a correction area or not.

After coupling of an AC coefficient finished on the final block, a change in a bit position changed in re-conversion processing till then is calculated at step S306. Then, an encoded code for correction is added at step S307 according to the number of changed bit positions and a change in a bit position is absorbed.

(2) Description of Adding Processing of a New MCU

Processing of adding a new MCU, which is performed at the MCU insertion unit 103, is processing for absorbing a change in a bit position by adding an invalid new MCU which has nothing to do with an image, immediately after an RST marker is inserted. Processing for adding a new MCU, which is performed at the MCU insertion unit 103, will be described with reference to the flowchart of FIG. 4.

At step S401, encoding of a DC coefficient is performed. The DC coefficient is a DC coefficient predicted value used in an MCU after the MCU added. As a predicted value of a DC coefficient is reset by an RST marker in process of decoding processing, this processing is for making an original DC coefficient predicted value available by the added new MCU.

At step S402, the EOB (End Of Block) code is added and blocks in an MCU finishes. At step S403, whether it is the final block in an MCU or not is determined. If it is the final block, the operation proceeds to step S404.

Step S404 is the same encoding of a DC coefficient as that in S401. Then at step S405, a change in a bit position which is changed in a series of processing till then is calculated. Then, an encoded code for correction is added according to the number of changed bit positions at step S406 and the change in the bit position is absorbed.

As the converted MCU is a part of an image in re-conversion processing of an existing MCU, which is performed at the MCU insertion unit 103, a small value is selected to be an encoded code for correction so as not to affect image quality as shown in FIG. 2B. As an added MCU does not form a part of an image in adding processing of a new MCU shown in FIG. 4, the MCU does not affect the image. Therefore, the encoded code for correction added at step S406 may be any code if only it can absorb a change in a bit position and meet the JPEG standard.

The encoded data copying controller 104 of FIG. 1 creates encoded data after conversion 106 by copying or inserting the encoded data to be sent out from the decoding processing unit 101, the addition MCU to be sent out from the MCU insertion unit 103, and the RST marker to be sent out from the RST marker insertion unit 102 in an appropriate position.

Figure 4:
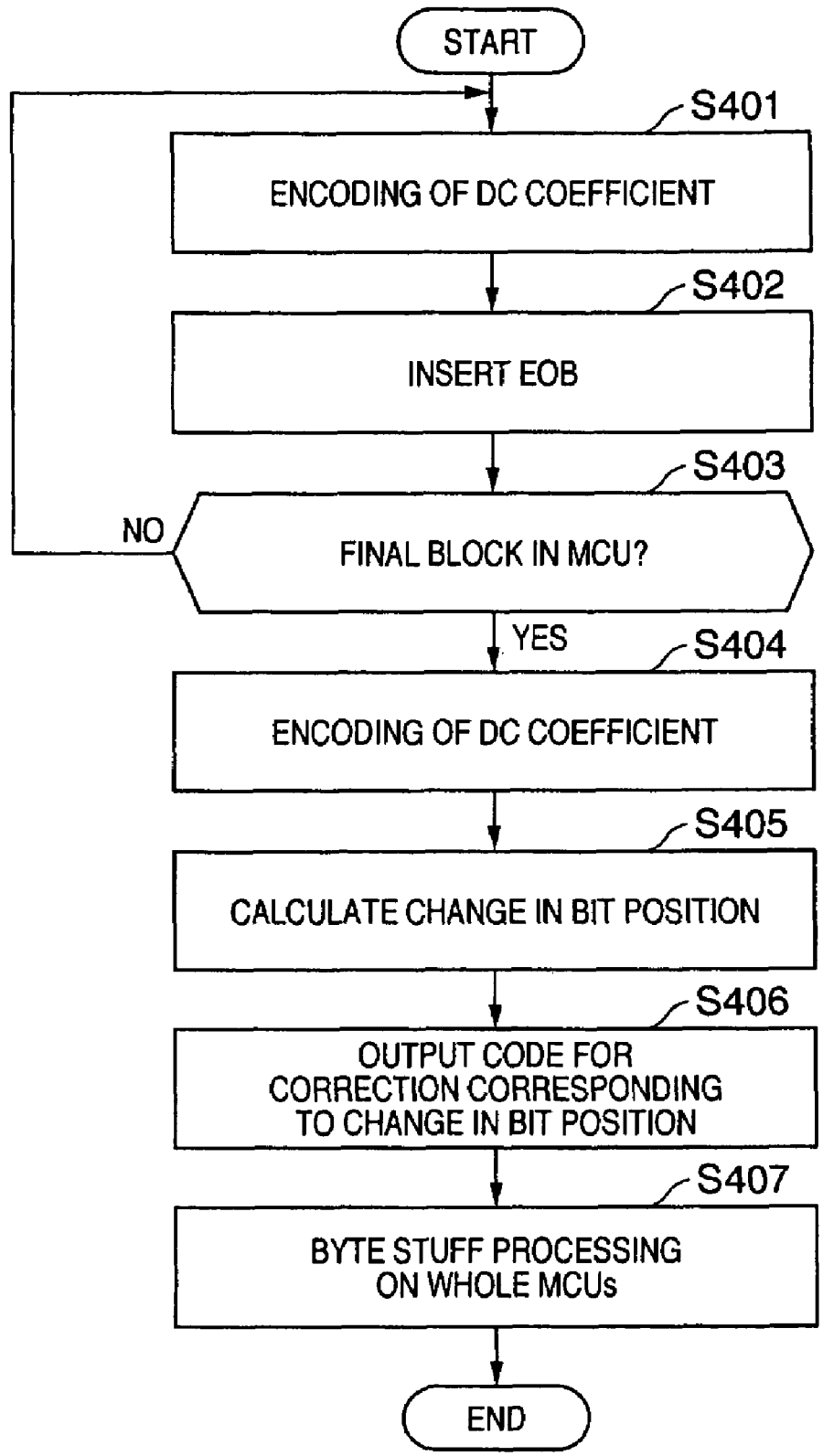
FIG. 4 is a flowchart showing a method for adjusting a bit position by adding a new MCU at an MCU inserting section.

When an RST marker is inserted, a bit position may change due to the insertion of the RST marker. In such a case, the variation of bit position is sent to the MCU insertion unit 103 as the number of bit-shifts. At the MCU insertion unit 130, a change in a bit position is calculated in consideration of the number of bit-shifts as mentioned above (FIG. 3 step S306 and FIG. 4 step S405).

The present invention will be described in detail with a specific example.

First Embodiment

This embodiment is an example in which the present invention is applied to the case where an RST marker is inserted into a JPEG encoded data and converted as shown in FIG. 1.

Figure 7:
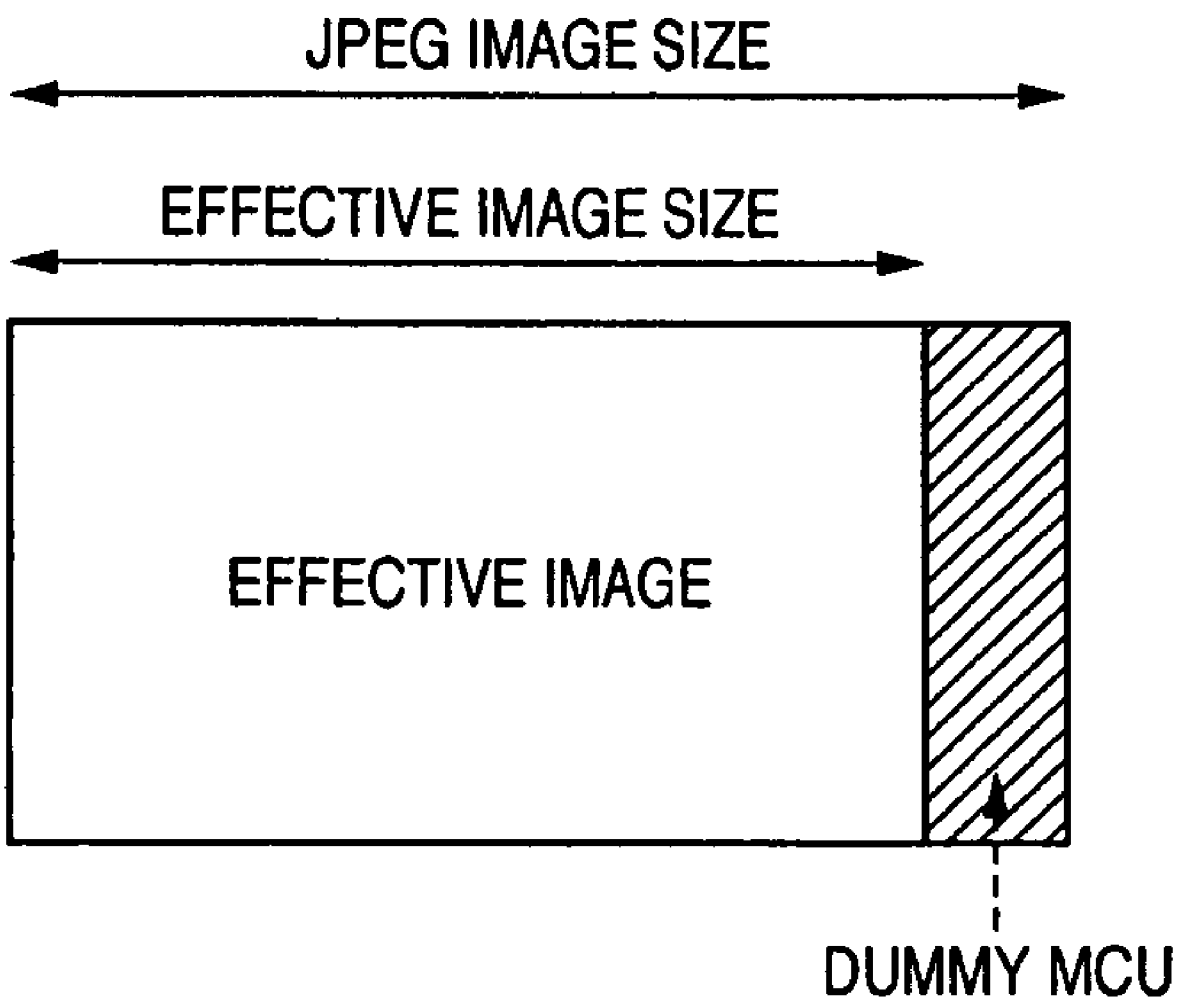
FIG. 7 is a diagram showing a size of a JPEG image and an effective image size of the first embodiment of the present invention.

As an applicable condition, an interval to insert an RST marker is for each MCU interval in the image width of JPEG encoded data. Processing performed at the MCU inserting unit 103 of FIG. 1 is insertion of a new MCU (invalid MCU). If an RST marker is inserted at the image width and an invalid MCU is added immediately after that, the encoded data after conversion is in the state shown in FIG. 7.

Figure 5:
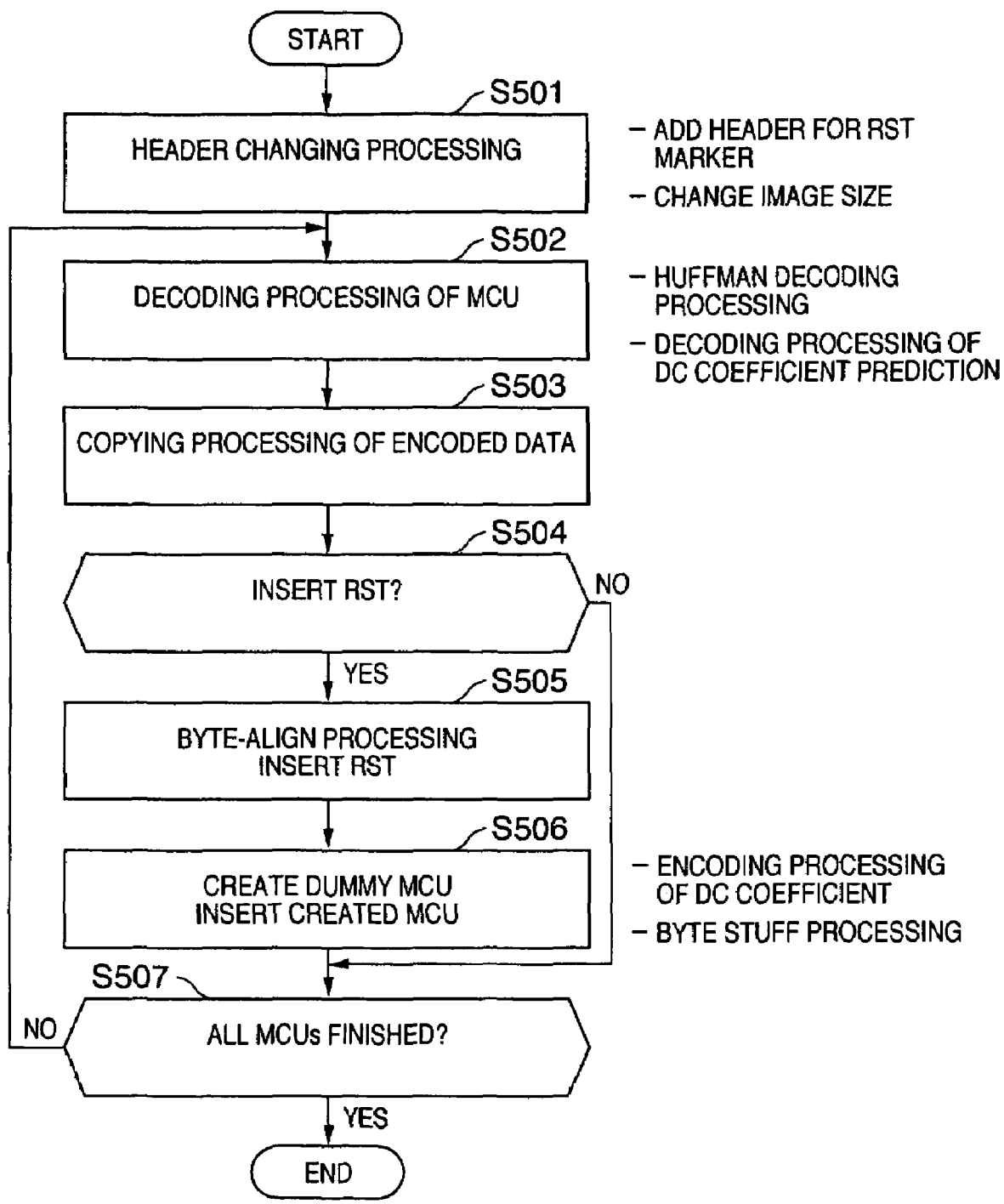
FIG. 5 is a flowchart showing the first embodiment of the present invention.

This embodiment will be described with reference to the flowchart shown in FIG. 5 and FIG. 1.

First, at step S501, changing processing of a header of a JPEG encoded image is performed. The changing processing performed at step S501 is addition of a marker code accompanying a change in a JPEG image size (width), a change in an effective size (width) of an image, and insertion of an RST marker. As an invalid MCU (data which has nothing to do with an image) is added in this embodiment, the effective image size and the JPEG image size are different. Accordingly, both sizes need to be rewritten at step S501. For example, image data is rewritten so that a bit which inserts information indicating the number of all the pixels for one line of image data or information indicating the number of effective pixels in a pixel of one line can be ignored. After step S501, the operation proceeds to a conversion processing steps of an actual image. The conversion processing of an image is basically performed for each MCU.

First, at step S502, decoding processing of an MCU is performed. That is processing performed at the decoding processing unit 101 of FIG. 1, and decoding of a Huffman code and decoding of a DC coefficient are performed. Then, at step S503, encoded data corresponding to the decoded MCU is copied as encoded data after conversion. That processing is performed at the encoding data copying controller 104 of FIG. 1.

Each time decoding and copying of an MCU complete, whether an RST marker is inserted or not is determined at step S504. As an RST marker is inserted for each width of an image in this embodiment, the RST marker is inserted each time processing of an MCU for an image width ends. Insertion of an RST marker is performed at S505. If no RST marker is inserted but it is determined that not all the MCUs in an image ends at step S507, processing of an MCU is performed again from step S502.

After an RST marker is inserted at step S505, a dummy invalid MCU (dummy data) is created and inserted at step S506. Creation of dummy MCU to be inserted is as described with reference to FIG. 4. The dummy MCU is created in a form of absorbing a change in a bit position due to insertion of an RST marker.

A series of processing is repeated for all the MCUs in an image to perform conversion processing of encoded data.

Figure 6:
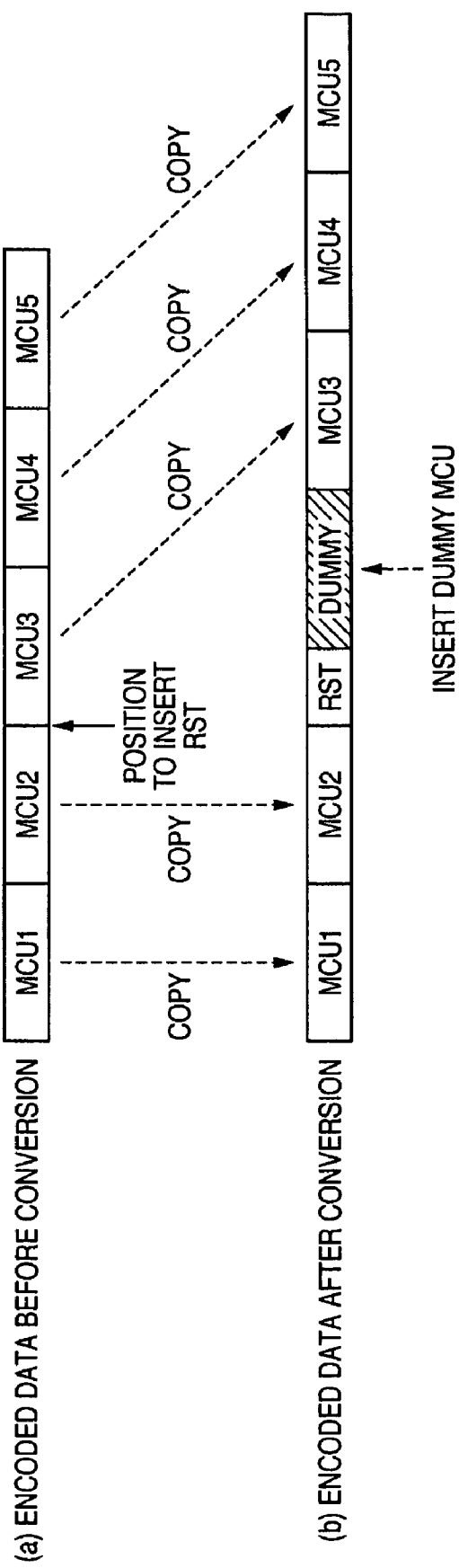
FIG. 6 is a diagram showing MCU arrangements before and after the conversion of a JPEG encoded image of the first embodiment of the present invention.

Advantages of this embodiment will be described with reference to FIG. 6. The reference character (a) in FIG. 6 denotes encoded data before conversion and (b) denotes encoded data after conversion. If an RST marker is inserted in FIG. 6 (a), MCUs after MCU3 can be copied from encoded data before conversion by inserting a dummy MCU after an RST marker is inserted. As no conversion processing of MCU need to be performed, efficiency of conversion processing of encoded data due to insertion of an RST may be improved.

Second Embodiment

This embodiment is the present invention applied to the case where an RST marker is inserted into a JPEG encoded data and converted as shown in FIG. 1.

As an applicable condition, an interval to insert an RST marker is smaller than an MCU in the image width of the JPEG encoded data. Processing performed at the MCU insertion unit 103 of FIG. 1 is conversion of an existing MCU.

Figure 8:
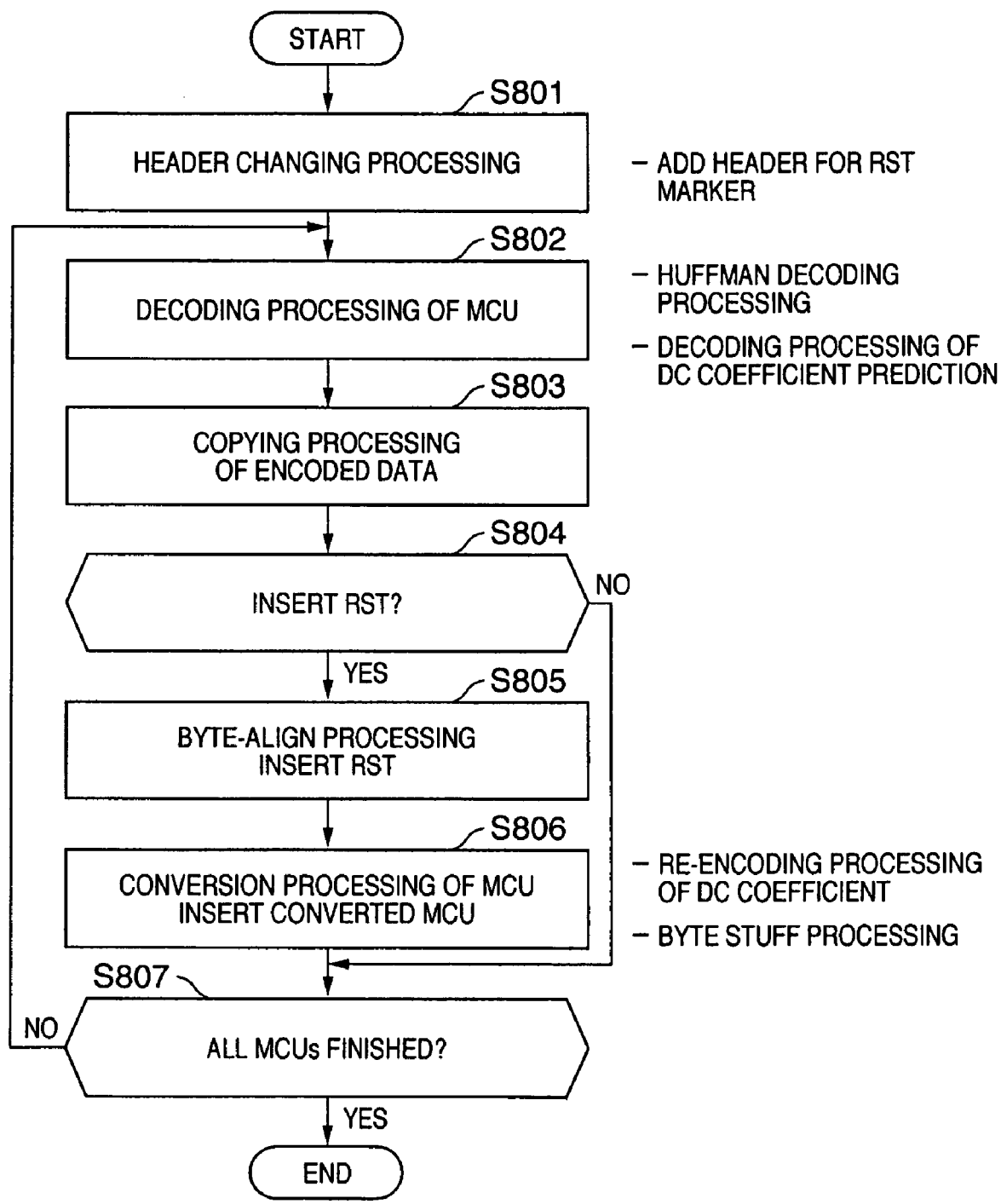
FIG. 8 is a flowchart showing the second embodiment of the present invention.

This embodiment will be described with reference to the flowchart shown in FIG. 8 and FIG. 1.

First, at step S801, changing processing of a header of a JPEG encoded image is performed. The changing processing performed at step S801 is addition of a marker code accompanying insertion of an RST marker.

A series of processing from step S802 to step S805 is the same as a series of processing from step S502 to step S505 described in the first embodiment.

After an RST marker is inserted, conversion processing of an MCU is performed at step S806. Then it is inserted as encoded data after conversion. The conversion processing is the same as that described based on a flowchart of FIG. 3 in the preferable embodiment above.

A series of processing above is repeated until all the MCUs in an image finishes performing conversion processing of encoded data.

Figure 9:
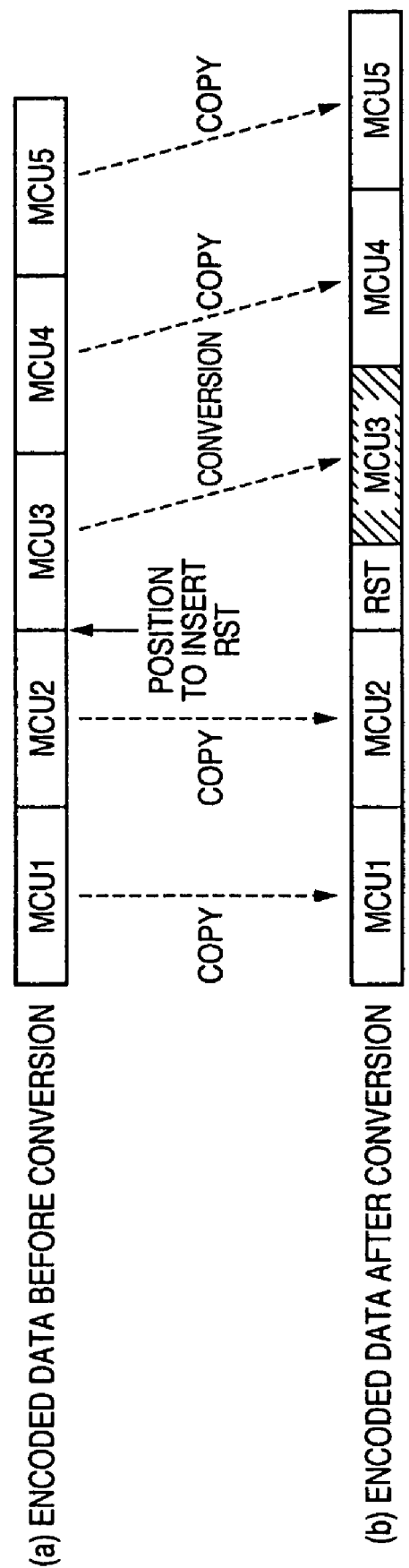
FIG. 9 is a diagram showing MCU arrangements before and after the conversion of JPEG encoded image of the second embodiment of the present invention.
Figure 10:
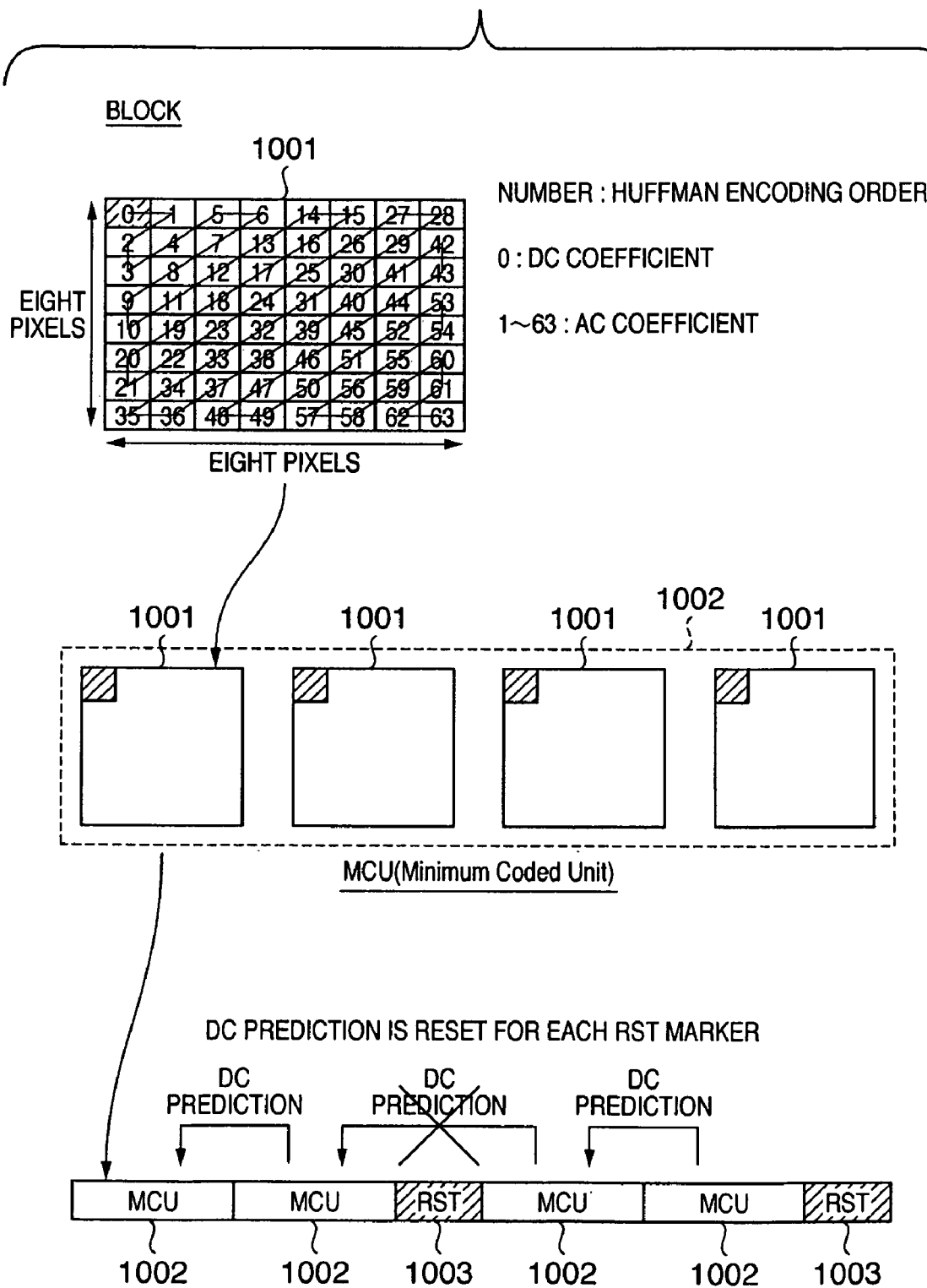
FIG. 10 is a diagram illustrating an arrangement of a JPEG encoded image.
Figure 11:
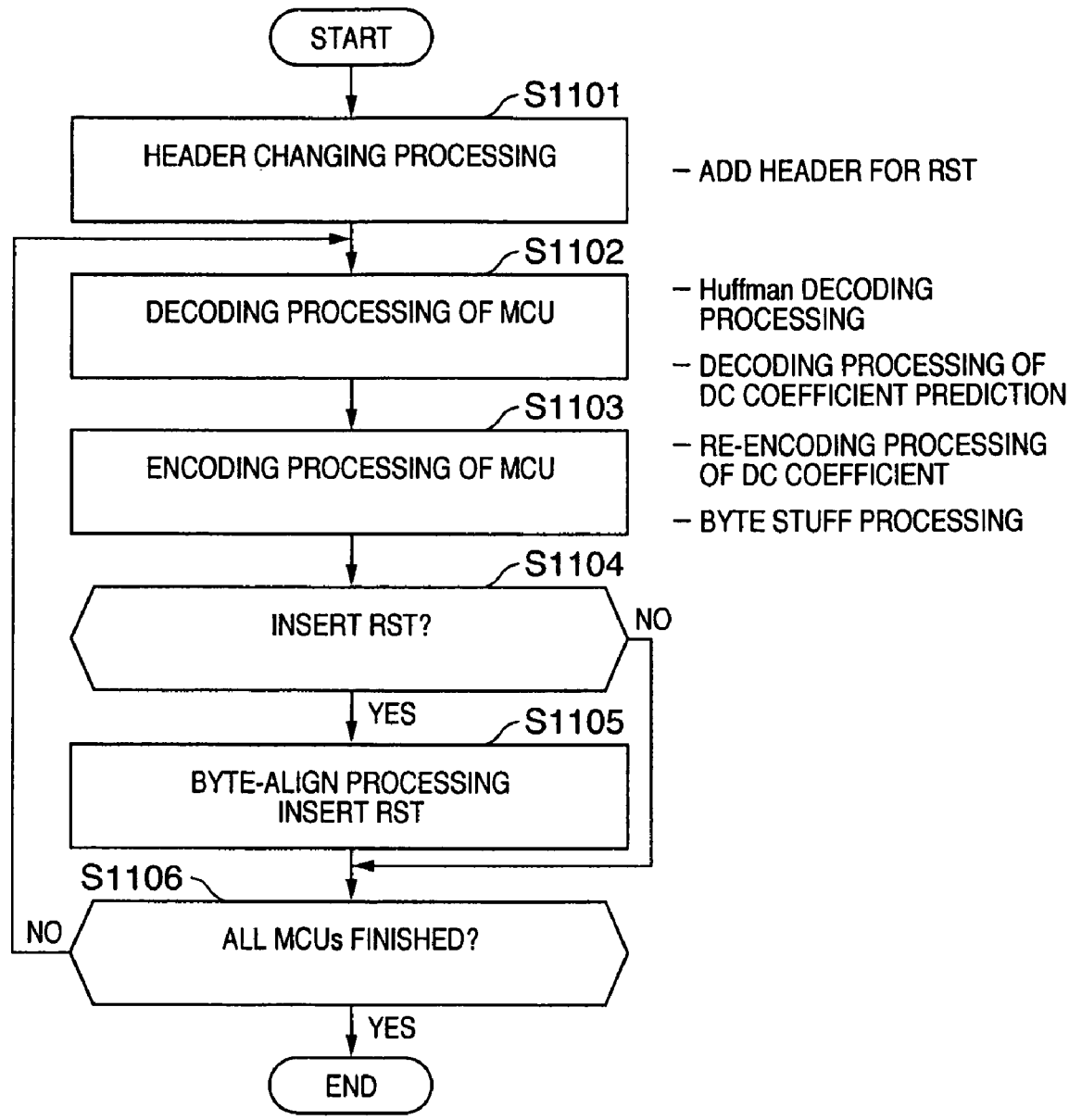
FIG. 11 is a flowchart showing a conventional approach of implementing RST marker insertion processing to a JPEG image into which no RST marker is inserted.

Advantages of this embodiment will be described with reference to FIG. 9. The reference character (a) in FIG. 9 denotes encoded data before conversion and (b) denotes encoded data after conversion. If an RST marker is inserted in FIG. 9 (a), only MCU3 after an RST marker is inserted is converted so as to absorb a bit position. That enables encoded data before conversion to be copied for MCUs after MCU3 (in FIG. 9, MCU4 and MCU5). As conversion processing is limited to some MCUs leaving the other MCUs need not to be converted. That can realize improvement of efficiency in conversion processing of encoded data due to insertion of an RST.

Other Embodiments

Note that the present invention can be applied to an apparatus comprising a single device or to system constituted by a plurality of devices.

Furthermore, the invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by computer, the program code installed in the computer also implements the present invention. In other words, the claims of the present invention also cover a computer program for the purpose of implementing the functions of the present invention.

In this case, so long as the system or apparatus has the functions of the program, the program may be executed in any form, such as an object code, a program executed by an interpreter, or scrip data supplied to an operating system.

Example of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (a DVD-ROM, a DVD-R and a DVD-RW).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

It is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Besides the cases where the aforementioned functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a computer processor, for example, a Central Processing Unit (CPU) or the like mounted on the function expansion board or function expansion unit performs all or a part of the actual processing so that the functions of the foregoing embodiments can be implemented by this processing.

As many apparently widely different embodiments of the present invention can be made without departing from the spirit and scope thereof, it is to be understood that the invention is not limited to the specific embodiments thereof except as defined in the appended claims.

This application claims the benefit of Japanese Application No. 2005-123502, filed Apr. 21, 2005, which is hereby incorporated by reference herein in its entirety.

What is claimed is:

1. An encoded data conversion method for converting encoded image data, the method comprising:
   inserting predetermined data into encoded image data; and
   inserting, after the predetermined data, a code for avoiding bit shifting from an original code and for eliminating a part of a re-encoding process of subsequent data after the predetermined data, wherein the inserting of the code is performed, at least in part, by a computer processor.

2. The encoded data conversion method according to claim 1, wherein the code includes a number of bits for eliminating the part of the re-encoding process of the subsequent data.

3. The encoded data conversion method according to claim 2, wherein
   the image data is for regenerating an image that includes a plurality of lines; and
   the predetermined data is inserted near an ending position of image data of a single line; and
   further comprising rewriting information indicating a number of all pixels of the image data or information indicating a number of effective pixels in pixels in a single line so that the inserted code can be ignored.

4. The encoded data conversion method according to claim 3, wherein the inserted code is dummy data.

5. The encoded data conversion method according to claim 2, further comprising calculating a variation of a bit position after inserting the predetermined data into the encoded image data, wherein the code is inserted after the predetermined data according to the variation.

6. The encoded data conversion method according to claim 1, wherein the code is inserted into a high-frequency component area of the image data.

7. A data conversion method for converting encoded image data, the method comprising:
   inserting a marker data into encoded image data; and
   inserting a code into the encoded image data so that a bit position of subsequent encoded image data after the marker data satisfies a predetermined criterion, wherein the inserting of the code is performed, at least in part, by a computer processor.

8. A data converter for converting encoded image data the data converter comprising:
   a computer processor coupled to a computer memory:
   a first inserting unit operable to insert a marker data into encoded image data; and
   a second inserting unit operable to insert a code into the encoded image data so that a bit position of subsequent encoded image data after the marker data satisfies a predetermined criterion.

9. A data conversion apparatus for converting encoded image data, the apparatus comprising:
   a computer processor coupled to a computer memory;
   a first inserting unit operable to insert predetermined data into encoded image data; and
   a second inserting unit operable to insert, after the predetermined data, a code for avoiding bit shifting from an original code and for eliminating a part of a re-encoding process of subsequent data after the predetermined data.

* * * * *